(12) United States Patent
Feenstra et al.

(10) Patent No.: US 7,274,416 B2
(45) Date of Patent: Sep. 25, 2007

(54) DISPLAY DEVICE

(75) Inventors: Bokke Johannes Feenstra, Eindhoven (NL); Robert Andrew Hayes, Eindhoven (NL); Lucas Josef Maria Schlangen, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 239 days.

(21) Appl. No.: 10/505,348

(22) PCT Filed: Feb. 7, 2003

(86) PCT No.: PCT/IB03/00454

§ 371 (c)(1),
(2), (4) Date: Aug. 19, 2004

(87) PCT Pub. No.: WO03/071347

PCT Pub. Date: Aug. 28, 2003

(65) Prior Publication Data

US 2005/0213014 A1 Sep. 29, 2005

(30) Foreign Application Priority Data

Feb. 19, 2002 (EP) .................................. 02075675

(51) Int. Cl.
*G02F 1/1347* (2006.01)
*G02F 1/07* (2006.01)
*G02F 1/153* (2006.01)
(52) U.S. Cl. ........................... 349/78; 349/79; 349/80; 359/250; 359/253; 359/272
(58) Field of Classification Search .................... None
See application file for complete search history.

(56) References Cited

U.S. PATENT DOCUMENTS

| | | | |
|---|---|---|---|
| 4,886,343 A * | 12/1989 | Johnson | 349/78 |
| 5,841,492 A | 11/1998 | Iwauchi et al. | |
| 6,580,482 B1 * | 6/2003 | Hiji et al. | 349/115 |
| 2002/0126249 A1 * | 9/2002 | Liang et al. | 349/187 |

FOREIGN PATENT DOCUMENTS

WO   WO99 53373   10/1999

* cited by examiner

Primary Examiner—David Nelms
Assistant Examiner—Michael H. Caley

(57) ABSTRACT

A subtractive display device comprising picture elements having sub-pixels, each sub-pixel comprising a stack of switchable layers (5,25) or components and a color filter part (21).

13 Claims, 3 Drawing Sheets

DISPLAY DEVICE

Figure 1A:
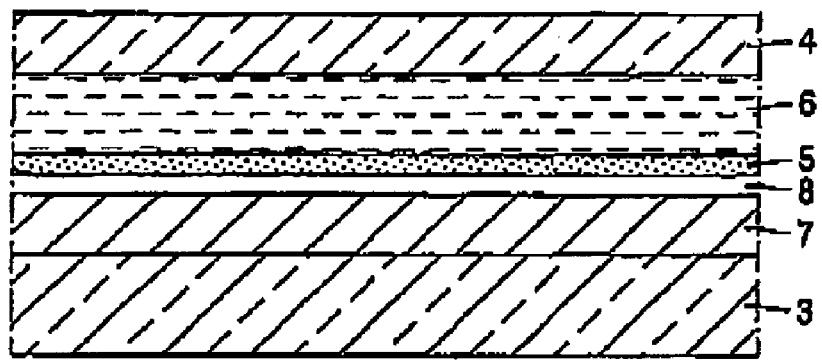

The invention relates to a subtractive display device comprising picture elements having sub-pixels, each sub-pixel having, viewed during operation in a direction normal to the substrates, at least two independently switchable electro-optical components, the device further comprising a color filter in which each sub-pixel color filter part absorbs or reflects one of a part of the optical spectral range the parts of the optical spectral range being substantially non-overlapping, the non-overlapping ranges together covering the optical spectral range.

Display devices like TFT-LCDs are used in laptop computers and in organizers, but also find an increasingly wider application in GSM telephones. Instead of LCDs, for example, (polymer) LED display devices are also being used.

Apart from these display effects which are well established by now other display techniques are evolving, which are suitable both for e. g. video applications, handheld applications and paper white applications.

EP 0 347 790 describes the use of a subtractive display device based on three switchable layers, which each comprise a layer of liquid crystal material. The technology shown however is costly since three different liquid crystal layers have to be provided with switching provisions (electrodes, driving electronics). Moreover there are technological problems in aligning the (sub) pixels in three of such superposed layers.

To overcome this problem the display device according to the invention comprises a color filter in which each sub-pixel color filter part absorbs or reflects one of a part of the optical spectral range, the device comprising means for controlling absorption or reflection of the remainder of the spectral range in each sub-pixel by the two independently switchable electro-optical components.

In particular one of the two switchable electro-optical components in each sub-pixel is switchable between a substantially transparent or translucent state and a state absorbing or reflecting at least a first part of the remainder of the spectral range. Said component itself may absorb or reflect the part of the optical spectral range which has been absorbed or reflected by the color filter part.

The other of the two switchable electro-optical components in each sub-pixel may be switchable between a substantially transparent or translucent state and a state absorbing or reflecting the remaining part of the remainder of the spectral range or to a state substantially transparent or translucent to the remaining part of the remainder of the spectral range. Again this other component may absorb or reflect apart of the optical spectral range, which has been absorbed or reflected by the color filter part or another switchable electro-optical components In this Application a transparent or translucent state is understood to comprise also a state of the electro-optical component (such as e.g. a layer) in which light is slightly diffused or absorbed, but the main direction of the light propagation is maintained. An example is a so-called forward scattering layer. On the other hand an absorbing state is understood to comprise a partially translucent state. The layer (component) should have no or substantially negligible back-scattering. In the same way an absorbing state is understood to comprise a partially translucent state. As an example one may consider a transparent layer or component comprising a certain color, in this example red light. If a small number of such particles is present in the layer it will remain transparent to (red) light. If a substantial number of such particles (above a certain number) is present, the layer will however absorb red light.

In a preferred embodiment the color filter has cyan, magenta and yellow color filter parts while at least one the other of the two switchable electro-optical components in each sub-pixel is switchable between a substantially transparent or translucent state and one of the colors cyan, magenta and yellow.

The display device can now be realized with two layers, which may have common substrates, leading to less cost and less light loss. Especially since subtractive techniques are used the reflectivity (or transmissitivity) may reach value up to almost 67%.

The invention in particular is useful to a principle discovered by the inventors so called layer break up, but on the other hand layer displacement may be used.

Especially in the latter case the two switchable electro-optical layers may comprise a common part. So in the context of this Application it is to be understood that "switchable layers" or "switchable components" may be separated by either a physical barrier such as a substrate or by an imaginary layer in said common part of the two switchable layers.

In a preferential embodiment of the invention a picture element has at least two first fluids of different colors of the color filter part and a second fluid, the second fluid being immiscible with the first fluids within a space between the first support plate and the second support plate, the second fluid being electroconductive or polar in which a picture element corresponds to a defined space having a wall part dividing the space into at least three sub-picture elements, in the first state each of the first fluids adjoining separate support plates within each sub-picture element.

These and other aspects of the invention are apparent from and will be elucidated with reference to the embodiments described hereinafter.

Figure 1B:
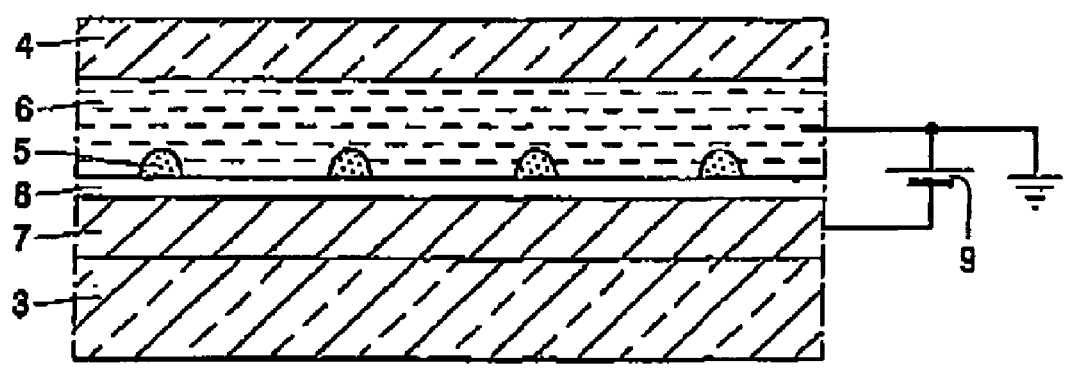
Figure 2:
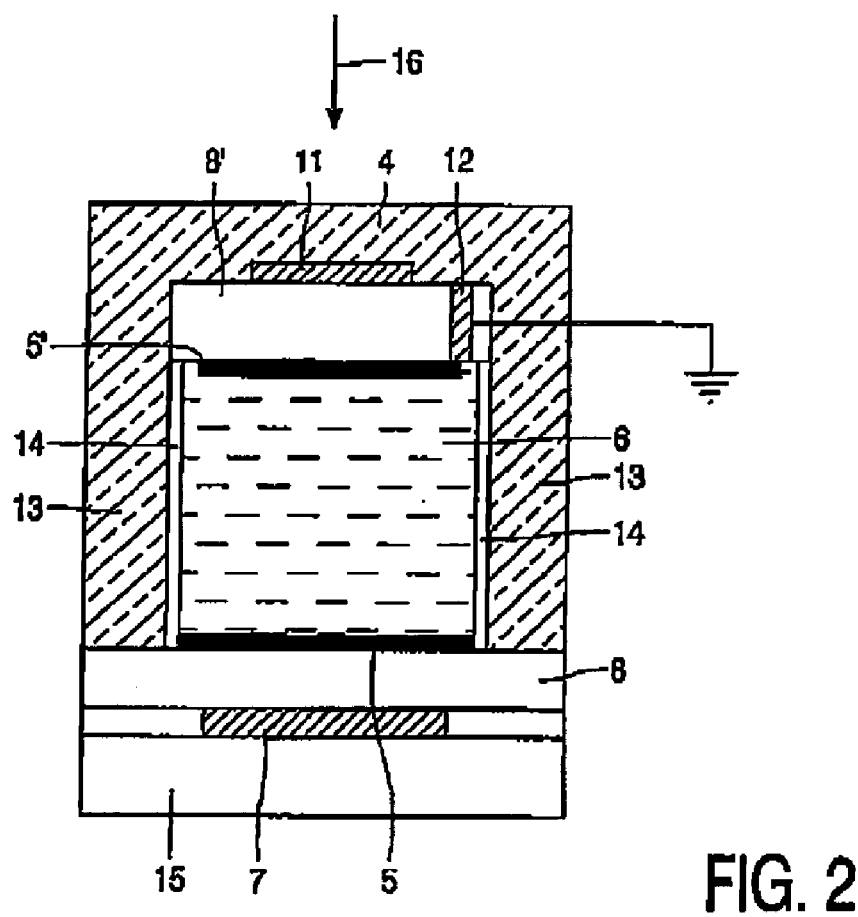
Figure 3:
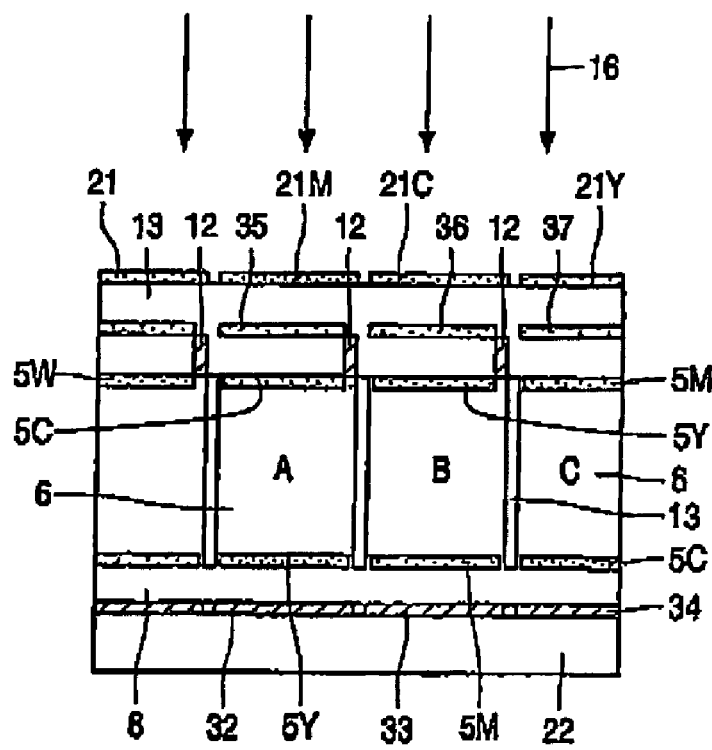
Figure 4:
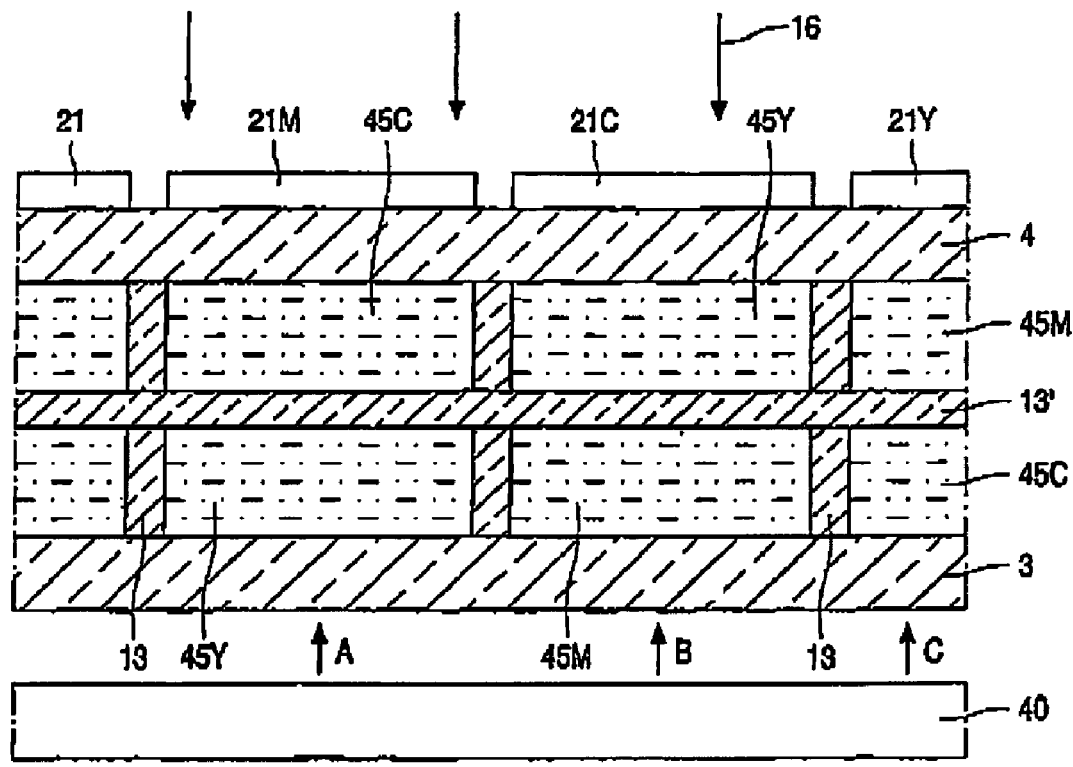
Figure 5:
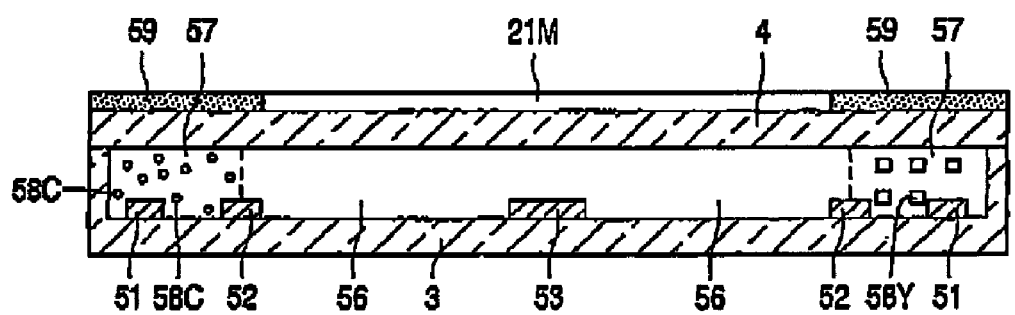

In the drawings:

FIGS. 1a and 1b area diagrammatic cross-section of a part of a display device to explain the invention, FIG. 2 is a diagrammatic cross-section of a part of a color display device according to the invention, while FIG. 3 shows a further embodiment of the invention while FIG. 4 shows another diagrammatic cross-section of a part of a display device according to the invention and FIG. 5 shows a further diagrammatic cross-section of a part of a display device according to the invention.

The Figures are diagrammatic and not drawn to scale. Corresponding elements are generally denoted by the same reference numerals.

FIG. 1 shows a diagrammatic cross-section of a part of a display device 1 according to the invention. Between two transparent substrates or support plates 3, 4 a first fluid 5 and a second fluid 6 are provided, which are immiscible with each other. The first fluid 5 is for instance an alkane like hexadecane or as in this example a (silicone) oil. The second fluid 6 is electroconductive or polar, for instance water or a salt solution (e.g. a solution of KCl in water).

In a first state, when no external voltage is applied (FIG. 1a) the fluids 5, 6 adjoin the first and second transparent support plates 3, 4 of e.g. glass or plastic. On the first support plate 3 a transparent electrode 7, for example indium (tin) oxide is provided and an intermediate hydrophobic layer 8, in this example an amorphous fluoropolymer (AF1600).

The inventors have found that when a voltage is applied (voltage source 9) the layer 5 breaks up into small droplets (FIG. 1b, fragmented film). Break-up occurs when the electrical energy gain is larger than the surface energy loss due to the creation of curved surfaces. As a very important aspect it was found that reversible switching between a continuous film and a fragmented film is achieved by means of the electrical switching means (voltage source 9).

This effect can be used for electro-optical effects, especially (if a colored oil is used) for a display effect. This is achieved with an optically active oil, for example an opaque or reflective oil. In other embodiments a fluid with optically active particles is used or a dye material is dissolved in the oil. The electro-optical effect may either be used in a transparent way, by using a back light, as for instance known from LCD technology or in a reflective way by using a (diffusive) reflector.

The droplet size depends on the voltage applied, which in principle offers the possibility of introducing intermediate transmission (or reflection) states (gray levels). However it was also found that, upon break-up, the area fraction is reduced practically instantly to about 50%. It is therefore hard to obtain area fractions between 50% and 100%. As a result, arbitrary analog gray scales in this particular range are difficult to be realized.

On the other hand the contrast is limited by the fraction of area occupied by the droplets resulting after the break-up. At practical voltages (in view of driving the display with IC drivers) a minimal area fraction of about 25% is observed. This can be decreased further by applying higher voltages which, however, would increase the dissipated power significantly and possibly preclude the use of low voltage IC drivers.

Although in this example oil break up has been considered, similar arguments apply to a device base on fluid displacement.

Such a further embodiment is shown in FIG. 2 which comprises two separate oil layers 5, 5' on either side of the fluid (water) 6.

By either fabricating the pixel walls 13 out of a different material than the material of the layers 8, 8' (e.g. Teflon like AF 1600) or providing these walls 13 with such material 14 with a sufficiently high surface energy such that:

$$\gamma_{H_2O,S} < \gamma_{oil,H_2O} + \gamma_{oil,S}$$

(S indicates the solid barrier material 14) no oil film forms on the barriers or material 14. This means that the upper oil film 5' and the lower oil film 5 are in no way connected to one another in either the first or the second state. Each layer can now be switched independently by contacting the water 6 by means of a through-connection (electrode 12 in FIG. 2) through the upper (or lower) AF1600 layer. In practice this can be done by grounding the water 6 by means of electrode 12 and applying a voltage to either electrode 7 or electrode 11. The device further comprises a diffuse white reflector 15. The viewing direction is indicated in FIG. 2 by the arrows 16.

Some examples of materials for which the inequality given above holds are parylene, PMMA (polymethylmethacrylate) and glass.

By giving the layers 5, 5' different colors, e.g. by introducing a dye, color displays are realized. This will be elucidated in the next example in which subtractive colors are used (FIG. 3). If two oil-layers 5 inside each sub-pixel are used one primary color per sub-pixel can be achieved. If a fixed subtractive color filter 21 is provided on top, a major improvement of the display performance is obtained. The pixel shown in FIG. 3 consists of three sub-pixels A, B and C. In each of the sub-pixels the order of the subtractive colors alternates, i.e. M(agenta), C(yan), Y(ellow) for sub-pixel A, C(yan), Y(ellow), M(agenta), for sub-pixel B and Y(ellow), M(agenta), C(yan) for sub-pixel C.

It is now possible to make each of the primary colors in at least two of the sub-pixels. For instance in sub-pixel A, the magenta color filter part 21M absorbs green and the (switchable) yellow bottom oil layer 5Y absorbs blue. If the top cyan oil layer 5C, which absorbs red is switched to a transparent state, the red light is reflected by the white background layer (reflector 22) and sub-pixel A will appear red.

In a similar way sub-pixel C will appear red by switching the bottom oil layer 5C to a transparent state. For sub-pixel B, the cyan color filter 21 C absorbs red and if none of the oil layers 5Y, 5M in B are switched to the transparent state the sub-pixel B will appear black. Since the sub-pixels are sufficiently small the human eye does not distinguish the individual responses and the total pixel will appear red with a maximum brightness of 67%. Other colors can be obtained in a similar fashion. A summary of the colors and the corresponding voltage states are given in Table 1.

TABLE 1

| | Voltages on electrodes | | | | | | | |
|---|---|---|---|---|---|---|---|---|
| Color | electr. 12 | electr. 32 | electr. 33 | electr. 34 | electr. 35 | electr. 36 | electr. 37 | brightness (%) |
| red | 0 | 0 | 0 | V | V | 0 | 0 | 67 |
| green | 0 | 0 | V | 0 | 0 | 0 | V | 67 |
| blue | 0 | V | 0 | 0 | 0 | V | 0 | 67 |
| white | 0 | V | V | V | V | V | V | 67 |
| black | 0 | 0 | 0 | 0 | 0 | 0 | 0 | 0 |

The absorption by the (switchable) yellow bottom oil layer as described above for sub-pixel A can also be obtained by using a blue oil without loss of brightness for the whole pixel. If the configuration of FIG. 3 is summarized schematically as shown in Table 2,

TABLE 2

| color filter element | sub-pixel (in FIG. 3) | switching component 1 | switching component 2 |
|---|---|---|---|
| cyan | B | yellow | magenta |
| magenta | A | cyan | yellow |
| yellow | C | magenta | cyan | similar results are obtained with the configurations as summarized in Tables 3, 4, and 5

TABLE 3

| color filter element | sub-pixel (in FIG. 3) | switching component 1 | switching component 2 |
|---|---|---|---|
| cyan | B | blue | green |
| magenta | A | blue | red |
| yellow | C | green | red |

TABLE 4

| color filter element | sub-pixel (in FIG. 3) | switching component 1 | switching component 2 |
|---|---|---|---|
| cyan | B | magenta | green |
| magenta | A | cyan | red |
| yellow | C | green | magenta |

TABLE 5

| color filter element | sub-pixel (in FIG. 3) | switching component 1 | switching component 2 |
|---|---|---|---|
| cyan | B | blue | yellow |
| magenta | A | red | cyan |
| yellow | C | green | magenta |

The protective scope of the invention is not limited to the embodiments described.

FIG. 4 for example shows an embodiment of a transmissive display in which the pixel walls 13 enclose a layer of a liquid crystal material 45 comprising a dye, which switches between a transparent or translucent and a dyed phase, the dyes coloring the sub-pixel layers Y(ellow)and C(yan) for sub-pixel A, M(agenta) and Y(ellow), for sub-pixel B and C(yan) and M(agenta) for sub-pixel C. Together with the color filter elements 21M, 21,C and 21Y Table 1 of the previous example now holds again. Electrodes for driving the display and further electronics are not shown in FIG. 5. The pixel walls 13 may enclose single (sub) pixels or a column or a row of such (sub) pixels. The display comprises a (schematically shown) backlight 40. The other reference numerals have the same meaning as those in FIGS. 2, 3.

Furthermore the invention is applicable to other display mechanisms which switch between a transparent or translucent state and a colored state, like electrochromic and electrophoretic displays. An example is given in FIG. 5, which shows a display sub-pixel having a magenta color filter element 21M. The reservoir 56 comprises a substantially transparent or translucent fluid while the auxiliary reservoirs 57 comprise particles, 58Y and 58C, which absorb at least blue and at least red respectively. By providing electrodes 51, 52, 53 with appropriate voltages the particles 58 move to the reservoir 56. The electro-optical components (particles, 58Y and 58C) are now intermixed within the reservoir 56. The auxiliary reservoirs 57 are provided with a black mask 59.

The particles do not have to be fully mobile and may also be partially fixed, for instance a working device can be based on a Cholesteric Liquid Crystal material of two different colors in which witching between a transparent or translucent state and a reflective state occurs at different voltages for different colors. The CLC material does not necessarily have to be a layer. It can also have the form of encapsulated flakes or particles.

Layers comprising such capsules or other layers comprising (switchable) reflecting or absorbing particles do not need to be completely transparent, as long as the main direction of the light propagation is maintained (translucent or forward scattering layers). Scattering may even be advantageous, provided no significant backscattering occurs, to obtain better absorption, leading to thinner layers. To this end the pixel walls 13 may be provided with a reflecting or absorbing layer.

In the example the color filter part absorb (or reflect) the colors cyan, magenta and yellow. In principle the device can also be based on a color filter having colors which absorb (or reflect) other parts of the optical spectral range and adapting the switchable components (layers) accordingly. For example one could use a first sub-pixel having a color filter part absorbing in the range 550-650 nm, a second sub-pixel having a color filter part absorbing in the range 450-550 nm and a third sub-pixel having a color filter part absorbing in the range 400-450 nm and 650-7000 nm. The optical spectral range on the other hand may include infrared and ultraviolet.

In general a device according to the invention can be understood as having a color filter in which n sub-pixel color filter parts absorber reflect n parts of the optical spectral range (preferably non-overlapping or having minimal overlap), the device comprising (n-1) switchable electro-optical components for controlling absorption or reflection of the remainder of the spectral range in each sub-pixel.

Although in the examples absorbing color filter parts have been considered, the color filter parts may also be reflecting the (parts of) the optical spectral range The invention resides in each and every novel characteristic feature and each and every combination of characteristic features. Reference numerals in the claims do not limit their protective scope. Use of the verb "to comprise" and its conjugations does not exclude the presence of the elements other than those stated in the claims. Use of the article "a" or "an" preceding an element does not exclude the presence of a plurality of such elements.

The invention claimed is:

1. A subtractive display device comprising picture elements having sub-pixels, each sub-pixel having, viewed during operation in a direction normal to substrates, at least two independently switchable electro-optical components, the device further comprising:
    a color filter in which each sub-pixel color filter part absorbs or reflects one of a part of the optical spectral range, the parts of the optical spectral range being substantially non-overlapping, the device comprising means for controlling absorption or reflection of remaining parts of the spectral range in each sub-pixel by the at least two switchable electro-optical components, the non-overlapping ranges together covering the optical spectral range, wherein the electro-optical components further comprise at least two switchable electro-optical layers, comprising at least one first fluid and a second fluid respectively, and wherein the second fluid and the first fluid are immiscible.

2. A subtractive display device according to claim 1 in which one of the at least two switchable electro-optical components in each sub-pixel is switchable between a substantially transparent or translucent state and a state absorbing or reflecting a first part of the remainder of the spectral range.

3. A subtractive display device according to claim 2 in which at least one further switchable electro-optical component in each sub-pixel is switchable between a substantially transparent or translucent state and a state absorbing or reflecting the remainder of the spectral range.

4. A subtractive display device according to claim 2 in which at least one further of the at least two switchable electro-optical components in each sub-pixel is switchable between a substantially transparent or translucent state and a state substantially transparent or translucent to a part of the remainder of the spectral range.

5. A subtractive display device according to claim 2 or 4 in which at least one further switchable electro-optical component in each sub-pixel is switchable between a substantially transparent or translucent state and a state substantially transparent or translucent to the remainder of the spectral range.

6. A subtractive display device according to claim 2 having cyan, magenta and yellow color filter parts, at least one of two switchable electro-optical components in each sub-pixel being switchable between a substantially transparent or translucent state and one of the colors cyan, magenta and yellow.

7. A subtractive display device according to claim 6 the other of the two switchable electro-optical components in each sub-pixel being switchable between a substantially transparent or translucent state and one of the colors cyan, magenta and yellow.

8. A subtractive display device according to claim 2 having cyan, magenta and yellow color filter parts, at least one of two switchable electro-optical components in each sub-pixel being switchable between a substantially transparent or translucent state and one of the colors cyan, magenta and yellow, the other of the two switchable electro-optical components in each sub-pixel being switchable between a substantially transparent or translucent state and the colors red, green and blue.

9. A display device according to claim 1 in which a sub-pixel corresponds to a defined space.

10. A display device according to claim 1 each sub-pixel having between a first support plate and a second support plate, viewed in a direction normal to the substrates, the device comprising means for creating at least two different states in each layer, the layers in a sub-pixel switching between a substantially transparent or translucent state and two different colors.

11. A display device according claim 10 having at least two first fluids of different colors of the color filter part, the second fluid being electroconductive or polar in which a picture element corresponds to a defined space having a wall part dividing the space into at least three sub-picture elements, in the first state each of the first fluids adjoining separate support plates within each sub-picture element.

12. A display device according to claim 1 which comprises an absorber or a reflector at the side of one of the substrates.

13. A subtractive display device comprising picture elements having sub-pixels, each sub-pixel having, viewed during operation in a direction normal to substrates, n independently switchable electro-optical components (n>2), the device further comprising a color filter in which each sub-pixel color filter part absorbs or reflects one of a part of the optical spectral range, the parts of the optical spectral range being substantially non-overlapping, the device comprising means for controlling absorption or reflection of remaining parts of the spectral range in each sub-pixel by (n-1) switchable electro-optical components, the non overlapping ranges together covering the optical spectral range wherein the electro-optical components further comprise least two switchable electro-optical layers, comprising at least one first fluid and a second fluid respectively, and wherein the second fluid and the first fluid are immiscible.

* * * * *